United States Patent [19]
Stanfield et al.

[11] Patent Number: 5,739,765
[45] Date of Patent: Apr. 14, 1998

[54] FILE FOLDERS FOR USE IN AN ELECTRONIC FILE LOCATING AND TRACKING SYSTEM

[75] Inventors: Joel D. Stanfield, Kentwood; Joseph R. Branc, Grand Rapids; Thomas G. Feldpausch, Hastings; William L. Miller, Ada, all of Mich.

[73] Assignee: Steelcase Inc., Grand Rapids, Mich.

[21] Appl. No.: 683,082

[22] Filed: Jul. 18, 1996

Related U.S. Application Data

[62] Division of Ser. No. 379,944, Jan. 27, 1995.

[51] Int. Cl.$^6$ ................................................. H04Q 1/00
[52] U.S. Cl. .................... 340/825.49; 340/572; 206/425
[58] Field of Search ........................... 340/825.49, 572, 340/573; 206/425

[56] References Cited

U.S. PATENT DOCUMENTS

| | | |
|---|---|---|
| 3,701,987 | 10/1972 | Leighton . |
| 3,757,944 | 9/1973 | Goodman . |
| 4,219,296 | 8/1980 | Fujii et al. . |
| 4,376,936 | 3/1983 | Kott ........................... 340/825.49 |
| 4,457,016 | 6/1984 | Pfeffer . |
| 4,476,469 | 10/1984 | Lander . |
| 4,595,922 | 6/1986 | Cobb et al. . |
| 4,636,634 | 1/1987 | Harper et al. . |
| 4,636,950 | 1/1987 | Caswell et al. . |
| 4,814,742 | 3/1989 | Morita et al. . |
| 4,818,855 | 4/1989 | Mongeon et al. . |
| 4,862,160 | 8/1989 | Ekchian et al. . |
| 4,866,255 | 9/1989 | Sing . |
| 4,879,756 | 11/1989 | Stevens et al. . |
| 4,924,219 | 5/1990 | Sato . |
| 4,973,086 | 11/1990 | Donnelly et al. . |
| 5,063,380 | 11/1991 | Wakura ........................ 340/825.49 |
| 5,113,349 | 5/1992 | Nakamura et al. . |
| 5,216,618 | 6/1993 | Arita et al. . |
| 5,218,466 | 6/1993 | Brooks . |
| 5,287,414 | 2/1994 | Foster . |
| 5,317,309 | 5/1994 | Vercellotti et al. . |
| 5,327,115 | 7/1994 | Swierczek . |
| 5,334,822 | 8/1994 | Sanford . |
| 5,389,919 | 2/1995 | Warren et al. . |
| 5,424,858 | 6/1995 | Gillotte . |
| 5,426,284 | 6/1995 | Doyle . |
| 5,450,070 | 9/1995 | Massar ........................ 340/825.49 |
| 5,455,410 | 10/1995 | Schneider . |

FOREIGN PATENT DOCUMENTS

| | | |
|---|---|---|
| 0361989 | 4/1990 | European Pat. Off. . |
| 56-110193 | 9/1981 | Japan . |
| 2185497 | 7/1990 | Japan . |
| 4268994 | 9/1992 | Japan . |

OTHER PUBLICATIONS

"The New Era of the Lan," Distribute Data Control Access, Dallas Semiconductor No Date.
"Automatic Identification Data Book," Dallas Semiconductor, pp. 194–205, 1994 No Month.
"Touch the Future," Automatic Identification by Dallas Semiconductor No Date.
"Advanced Information," DS2405 Addressable Switch, Dallas Semiconductor No Date.

(List continued on next page.)

*Primary Examiner*—Brian Zimmerman
*Attorney, Agent, or Firm*—Price, Heneveld, Cooper, DeWitt & Litton

[57] ABSTRACT

A file tracking system including a processor, which maintains and interfaces with a database, a plurality of file folder retainers, and a plurality of file folders. The file tracking system actively maintains and updates the database, which includes file information, file location, and unique file address for the plurality of files, by providing interactive communication between the processor, the folder retainers, and the file folders. Each file folder may include an indicator light, such as an LED, which a user may cause to blink when trying to locating the file folder at a location accessed from the database.

41 Claims, 9 Drawing Sheets

OTHER PUBLICATIONS

"User's Manual," DS9092K Touch Memory Starter Kit, Version 3.0, Dallas Semiconductor, Feb. 1993.

"50 Ways to Touch Memory," Third Edition, Dallas Semiconductor, Aug. 1994.

"Book of DS19xx Touch Memory Standards," Dallas Semiconductor, Feb. 1994.

"DS199x Touch Memory Used in Paris Garbage Collection" No Date.

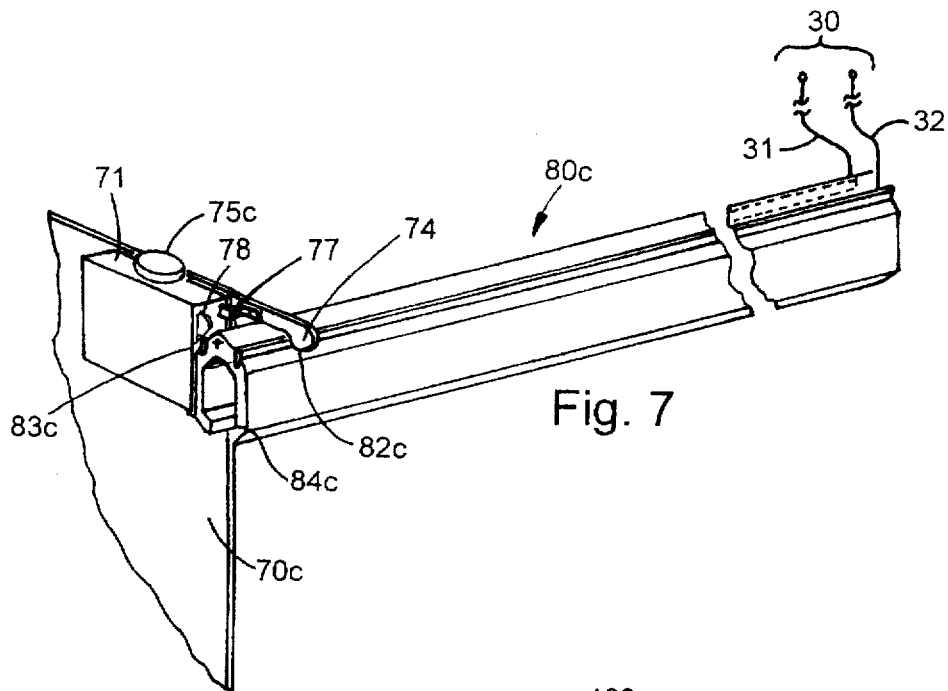
Fig. 7
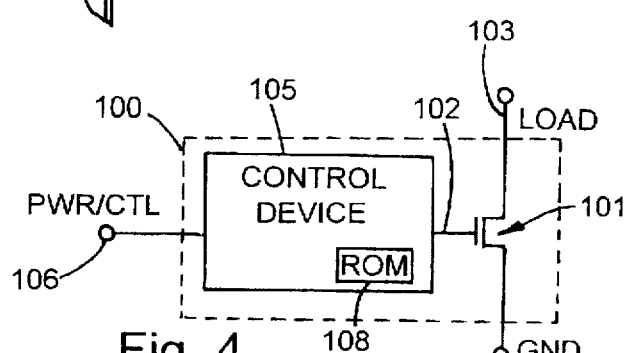
Fig. 4
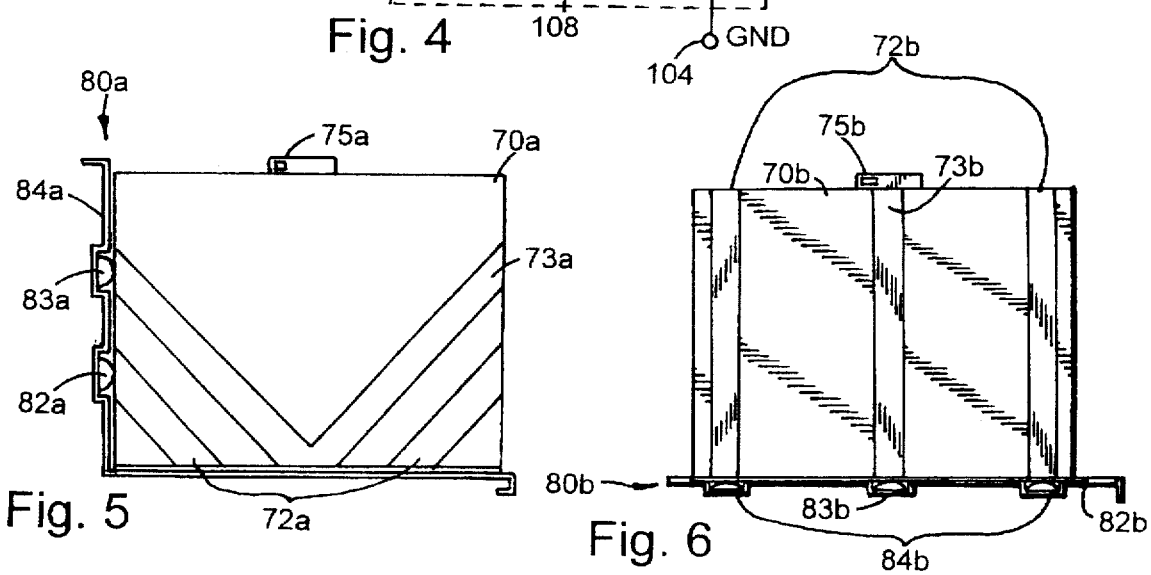
Fig. 5
Fig. 6

FILE FOLDERS FOR USE IN AN ELECTRONIC FILE LOCATING AND TRACKING SYSTEM

This is a division of application Ser. No. 08/379,944, filed Jan. 27, 1995.

BACKGROUND OF THE INVENTION

In general, the present invention relates to an electronic system, hardware, and method for tracking the location of files and their containers. More specifically, the present invention relates to an electronic file tracking system that maintains a database identifying each file and its current location by interactive communication between a computer processor and the file folders. The invention is particularly adapted for use with office furniture.

In a typical office environment, files are normally stored in various file cabinets located throughout the office. Each file cabinet or group of file cabinets stores files belonging to a particular category. These files are typically organized in an alphabetical or numerical order within the drawers of the file cabinet or group of file cabinets. Files may also be stored on or in various shelving units, trays, boxes, work surfaces, bins, compartments, tables, desk drawers, or carts. In order to make these files accessible to all office personnel, the files must be stored in an organized manner. Office personnel expend a substantial amount of time retrieving files, replacing files back into the file cabinets, and maintaining the organization of the files.

When someone wishes to obtain a particular file, he or she must determine in which office, which file cabinet, and which drawer of the file cabinet the file is supposed to be located. If the person looking for the file does not know the location of the file first hand, he or she must make inquiries to the other employees or check a manually maintained listing of the file organization to locate the file. Once this person identifies where the file is suppose to be located, the person must search through the numerous files stored in the drawer to determine if the file is actually located in the drawer. In searching through the file cabinet drawer, this person may discover that the file is not located where it was supposed to be. The person must then again inquire about the office to determine if someone else has the file and, if no one else has the file, this person must search through other file drawers to determine if the file is misfiled or lost. Active files tend to become stacked on the desktops of the employees most recently using those particular files, leading to poor accessibility for others. Clearly, tracking down a file may consume a significant portion of an employee's time and any time spent looking for or reorganizing files is an inefficient use of that employee's time.

To maintain an organized system, when someone must add a number of new files to a particular drawer of a file cabinet that is already filled to capacity, he or she must shift those files in the back of the drawer to another drawer, which may also be filled to capacity. Further, whenever a sequential ordering scheme is used to organize files, even frequently accessed files may be dispersed throughout a number of drawers rather than in the front of a single file drawer where the frequently accessed files would be more easily accessible.

The above problems are particularly prevalent in hospitals, doctors offices, law offices, government agencies, and anywhere else where large amounts of printed documents or other media are handled and maintained.

One approach that was developed to alleviate some of the above problems in tracking files is to provide a bar code label on each file folder and to maintain a database correlating the bar code I.D. of the file and its relative location. In order to accurately maintain the file locations in the database, bar code readers are placed about the office for employees to scan the bar code and enter a new location whenever the employees move a file from one location to another.

The problem with this approach is its reliance upon the employees to take the time to scan the bar code and enter user and location identification information into the database every time an employee pulls a file out of a file drawer or off a shelf. Furthermore, the database may only identify the general location of the file, which may be a location where many other files are also located. Thus, although someone looking for a file may know its general location, this person may spend considerable time trying to locate the file amongst the numerous other files, particularly if the file is misfiled. Additionally, not all possible locations and potential users of the files may be identified within the database. Thus, the database may not accurately reflect the exact location of a file.

SUMMARY OF THE INVENTION

Accordingly, the present invention has been made to overcome the above problems of the conventional filing system. The file tracking system of the present invention automatically determines when a file has been removed from its previous location, when it is returned, and determines when a new file has been added to the system. Additionally, the file tracking system of the present invention allows users to easily and accurately identify the exact location of a file by having a processor communicate with a device carried by the file folders and activate an indicator, such as a light, on the file folders and/or file cabinets in response to a signal sent by the processor. Thus, the present invention requires minimal human interaction to maintain an accurate database identifying the location of the files while permitting both random and ordered filing of the file folders. Moreover, the file tracking system of the present invention may be inexpensively and readily implemented in existing office furniture.

Additional features and advantages of the invention will be set forth in part in the description which follows and in part will be apparent from the description, or may be learned by practice of the invention.

The features and advantages of the invention may be realized and obtained by means of the instrumentalities and combinations particularly pointed out in the written description and claims hereof as well as the appended drawings.

To achieve these and other advantages, and in accordance with the purpose of the invention as embodied and broadly described herein, the file tracking system of this invention includes a database for maintaining at least file identity, file location, and unique file address for a plurality of files, a processor for interfacing with the database and issuing control signals, a bus connected to the processor, a folder retainer connected to the processor by the bus, a plurality of file folders, each file folder including an addressable device adapted to be electrically connected to the bus when the file folder is placed in the folder retainer. Each folder may include an indicator which is activated when the addressable device receives a control signal from the processor including the unique address corresponding to the file folder. The database may additionally store the following: access information, which may be used to prevent individuals from accessing certain file folders; retention information, which may be used to determine the length of time since the file folder was last accessed in order to determine whether the file may be purged; classification information, which may indicate any classification groups the file folder is associated with; access history, which may indicate who checked out the file folder and when the file folder was checked in or out; key word lists, which list certain key words that describe or may be found in the file; and location history information, which may indicate the locations and dates at which the file folder has been located over a period of time.

The above features and advantages may also be attained by using the file cabinet of the present invention in a file tracking system. The file cabinet of the present invention includes a plurality of file drawers, at least one file drawer including a first conductor for providing control signals a file folder when the file folder is placed in the file drawer, the control signals being provided by the file tracking system, and a second conductor for providing a return path from the file folder placed in the file drawer.

Additionally, the advantages of the present invention may be attained by using a file folder of the present invention in a file tracking system. The file folder of the present invention includes at least one surface, an addressable device carried by the file folder and having a unique address, a first conductor on the surface electrically coupled to the addressable device for providing control signals to the addressable device when the file folder is placed in a folder retainer, the first conductor adapted to communicatively couple to a processor of the file tracking system, the control signals being provided by the processor, and a second conductor on the surface for providing a return path from the addressable device.

These and other features, objects, and benefits of the invention will be recognized by those who practice the invention and by those skilled in the art, from the specification, the claims, and the drawing figures.

BRIEF DESCRIPTION OF THE DRAWINGS

The accompanying drawings which are incorporated in, and constitute a part of, this Specification illustrate several embodiments of the invention and, together with the description, serve to explain the objects, advantages, and principles of the invention.

FIG. 4 is an electrical schematic view of an addressable switch which may be used in the file tracking system of the present invention;

FIG. 5 is a perspective view of a file folder in electrical contact with a bus conductor according to a first implementation in the file tracking system of the present invention;

FIG. 6 is a perspective view of a file folder and a bus conductor according to a second implementation in the file tracking system of the present invention;

FIG. 7 is a perspective view of a hanging file folder in electrical contact with a bus conductor according to a third implementation in the file tracking system of the present invention;

DETAILED DESCRIPTION OF THE PREFERRED EMBODIMENTS

Reference will now be made in detail to the present preferred embodiments of the invention, examples of which are illustrated in the accompanying drawings.

Figure 1:
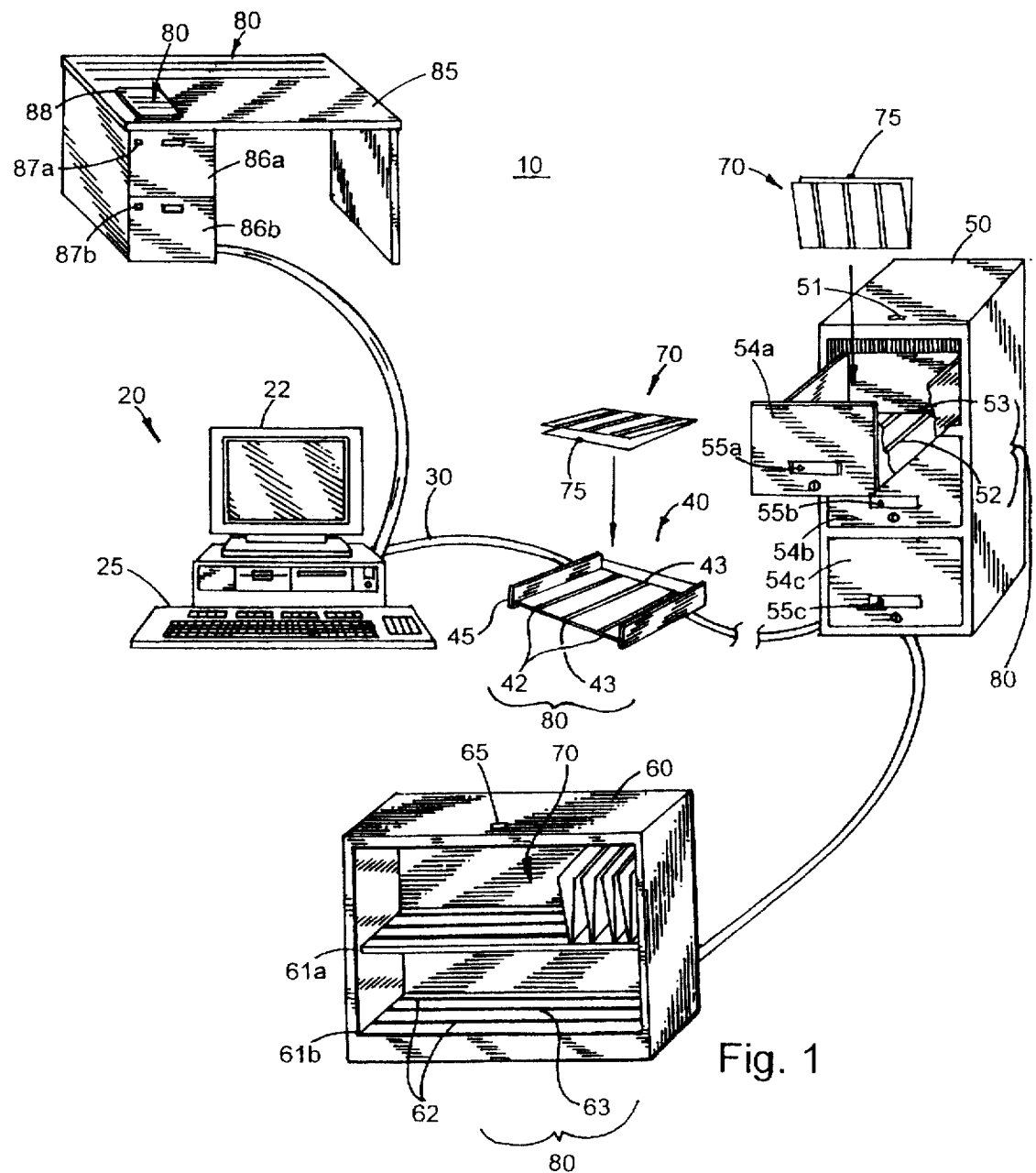
FIG. 1 is a pictorial view of a file tracking system constructed in accordance with a first embodiment of the present invention.

The exemplary embodiment of the file tracking system of the present invention is shown in FIG. 1 and is designated generally by the reference numeral 10. As used throughout this description of the invention and in the following claims the term "media" includes paper, film, X-ray film, magazines, books, photographs, microfiche, video and audio tapes, models, exhibits, or anything else retained and filed. The term "file folders" refers to any type of structure for containing media including bi-fold, side-tab, expandable, and tri-fold file folders, and may further include various types of binders, jackets, envelopes, boxes, holders, cartons or the like. The term "files" as used herein includes the file folder and all media inside. The term "folder retainers" refers to various numbers of, and/or combinations of, file trays, file cabinets, shelving units, desks, furniture drawers, packing boxes, archive tubs, wall-mounted or countertop file racks, bins, carts, pads, mats, desk tops, countertops, any work surface on which file folders are commonly stacked or placed, or any other structure for holding file folders. A "file locating device" broadly includes any device that would assist a user to locate a file. An "annunciator" is a file locating device that audibly and/or visually announces the location of a file, and includes audible alarms, such as beepers, and visual indicators, such as light emitting diodes (LEDs). Additionally, other types of annunciators or, as more broadly defined herein, file locating devices, such as an audible alarm, may supplement or replace the visual indicator lights used in the file tracking system.

In general, file tracking system 10 includes a processor 20 and a plurality of folder retainers. For purposes of example, FIG. 1 shows a file tray 40, a file cabinet 50, a shelving unit 60, and a desk 85 although any of the above defined folder retainers may be used in various numbers and combinations.

A bus 30 communicatively couples processor 20 with the folder retainers. Each folder retainer includes bus conductors 80 for electrically contacting one or more file folders 70. Bus 30 preferably includes two lines. One for providing control signals to file folders 70 and another for providing a return. Although the preferred embodiment utilizes two lines, bus 30 may be implemented in any bus using any number of physical or virtual, multiplexed lines. Bus conductors 80 may be included on a surface of a file retainer such as a file drawer, or embedded within a working surface, such as a desktop, countertop, shelf, or tray, to create a file retainer location thereon.

Processor 20 includes a display 22 and an input device 25, such as a keyboard. Preferably, processor 20 is a personal computer. As will be explained in greater detail below, processor 20 maintains and interfaces with a database under the direction of an operating program that instructs processor 20 to actively communicate with the folder retainers and the file folders 70 via bus 30. In this manner, processor 20 may update the database and maintain accurate information on the location of file folders 70 placed in the system. The database used may be any commercially available ANSI SQL compatible database, such as Microsoft Access™ database.

A tray 40, which is useful in the file tracking system 10 of the present invention, may be formed of a conventional file tray modified to include a bus conductor 80 having at least two conductive strips (42, 43), an indicator light 45, such as a light emitting diode (LED), and an addressable switch 100 (FIG. 4), which is connected between the conductive strips and indicator light 45. Preferably, the conductive strips include at least one ground conductor 42 and at least one control conductor 43 connected to bus 30. As will be described in greater detailed below, tray 40 provides a communication link between file folders 70, which are placed thereon to processor 20 whereby processor 20 can track the location of file folders 70 placed on file tray 40 and can selectively light indicator light 45 on tray 40 and any indicator light 75 on file folders 70.

File cabinet 50 includes a plurality of drawers 54a–54c, each of which includes an indicator light 55a–55c on an outer drawer face. Each drawer 54a–54c further includes a bus conductor 80 having at least one ground conductor 52 and a control conductor 53, which contact the conductive strips of file folders 70, and an addressable drawer switch 100 (FIG. 4), which is connected between ground conductor 52, control conductor 53, and indicator light 55a–55c. File cabinet 50 may optionally include a branch indicator 95 (FIG. 3) associated with a branch control point 92 (FIG. 2) and having a unique cabinet address and an indicator light 51 that can be lit whenever processor 20 transmits a control signal including the unique cabinet address of the addressable cabinet switch.

Shelving unit 60 includes at least one shelf 61a–61b, which includes a bus conductor 80 having at least one ground conductor 62 and a control conductor 63 for contacting the conductive strips of file folders 70. Shelving unit 60 also preferably includes an addressable switch 100 having a unique address and an indicator light 65, which can be lit whenever processor 20 transmits a control signal including the unique address of the addressable switch.

Desk 85 includes at least one drawer 86a, 86b which includes a bus conductor 80 therein and an indicator 87a, 87b on an outer face thereof. In addition, desk 85 may include a bus conductor 80 embedded in a work surface thereof. Further, a mat 88 having a bus conductor 80 embedded therein may be placed on the top of desk 85 or any other working surface of an article of furniture.

Figure 2:
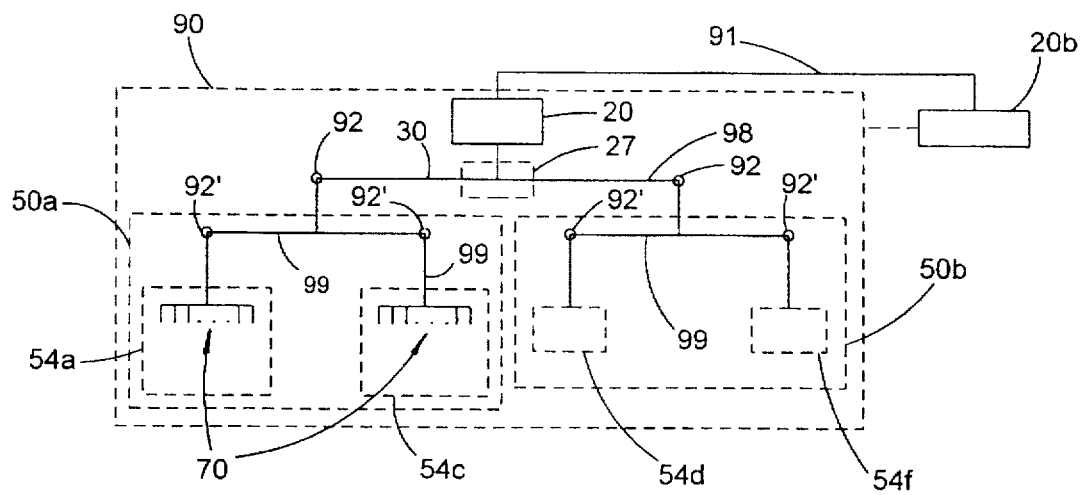
FIG. 2 is a block diagram illustrating the hierarchy of the file tracking system of the present invention.

FIG. 2 illustrates a typical system hierarchy employed when several branch connections exist in the system. A user's work area 90 may include, for example, a processor 20 and a plurality of file cabinets 50. Because each file cabinet 50 includes a plurality of drawers 54a–54c, which, in turn, contain a plurality of file folders 70, file tracking system 10 preferably utilizes the hierarchy shown in FIG. 2 to separately activate a single branch at a time. To enable a single branch to be activated at a time, file tracking system 10 preferably includes a plurality of branch control points 92,92', which may be individually activated to permit access to the branch controlled by the branch control point 92. Thus, to access file folders 70 in a drawer 54a of file cabinet 54a, processor 20 transmits a control signal to the branch control point 92 for the file cabinet 54a such that processor 20 may now transmit a control signal to the branch control point 92' for drawer 54a. After processor 20 transmits a control signal to branch control point 92 for cabinet 54a, processor 20 transmits a control signal to the branch control point 92' for drawer 54a to activate the bus conductors 80 located in drawer 54a thereby allowing processor 20 to communicate with file folders 70 included in file drawer 54a. Alternatively, a processor 20 that is located outside user's work area 90 may access file folders 70 within user's work area 90 by transmitting control signals through a network 91. File tracking system 10 may further include a serial port adaptor or secondary processor 27, which is connected to receive control signals from a serial port of processor 20, convert the received control signals to a format appropriate for a single pair bus, and distribute the control signals to the correct file cabinet 50 or other folder retainer connected to the system.

Figure 3:
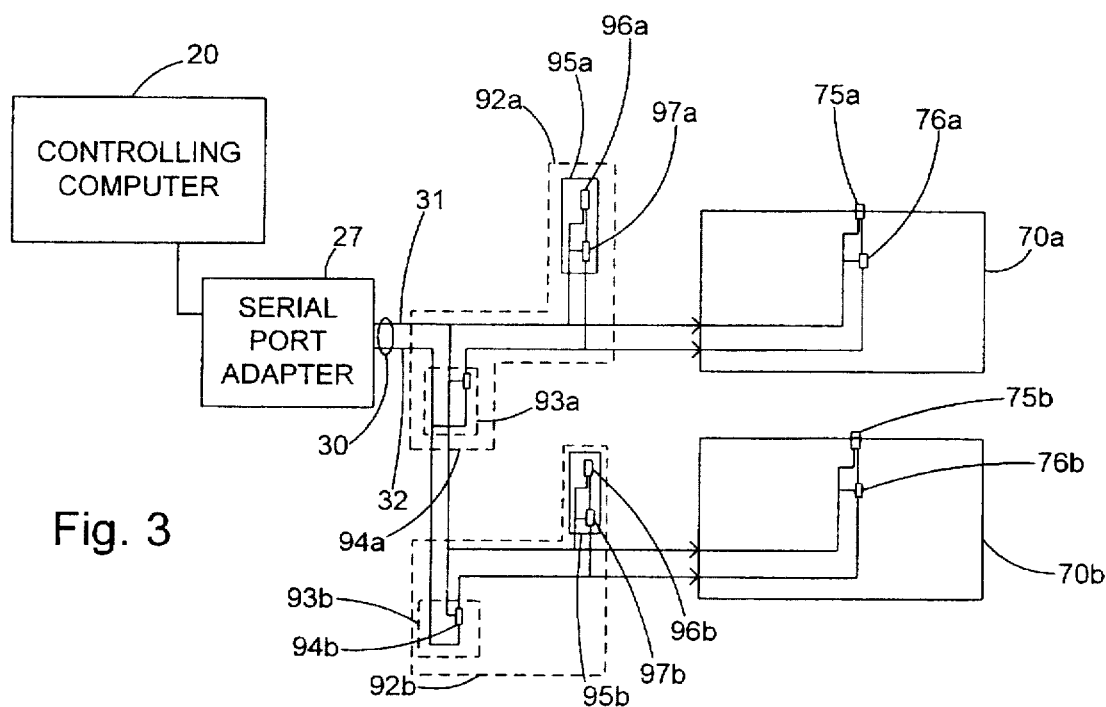
FIG. 3 is an electrical schematic view illustrating the electrical connections of a portion of the file tracking system shown in FIG. 1.

FIG. 3 shows an exemplary electrical schematic of the connections between processor 20 and file folders 70. As shown in FIG. 3, bus 30 includes a control line 31 and a ground line 32. Bus 30 is preferably a single pair bus. In the hierarchical arrangement shown in FIG. 3, branch control point switch assemblies 93a and 93b represent control points for activating the bus conductors 80 of two different file drawers 54 of a file cabinet 50. Although only one file folder (70a, 70b) is shown for each file drawer 54, each file drawer 54 will typically have a plurality of file folders 70 contacting its bus connector 80.

Each file folder 70 preferably includes a folder indicator light 75 and an addressable folder switch 76 having a unique address associated therewith. Alternatively, each folder may include an addressable device when an indicator is not employed such that each folder has a unique ID tag that may be communicated to processor 20. Although the file folders 70 are illustrated as bi-fold file folders, as stated above, the file folders may be any type of file folder as previously defined.

FIG. 4 shows the general structure of an addressable switch 100 useful in the file tracking system of the present invention. Addressable switch 100 includes a load transistor 101 having a gate 102, a source serving as a load terminal 103, and a drain serving as a ground terminal 104. Addressable switch 100 further includes a digital control device 105 connected between gate 102 and a control terminal 106. Digital control device 105 includes a read only memory (ROM) 108 in which the unique address of addressable switch 100 is stored.

Digital control device 105 receives control signals at control terminal 106. These control signals include an address and a command. When digital control device 105 senses a control signal at control terminal 106, digital control device 105 compares the address in the received control signal to the unique address stored in ROM 108. If the address contained in the control signal is not the same as the unique address stored in ROM 108, digital control device 105 awaits further control signals. If, on the other hand, the address contained in the control signal is the same as the unique address stored in ROM 108, digital control device 105 executes the command contained in the received control signal or contained in a subsequently transmitted control signal.

In the context of the present invention, addressable switch 100 may perform various tasks in response to an appropriate command received at control terminal 106. For example, digital control device 105 may change the state of load transistor 101 between conductive and nonconductive states by controlling the voltage applied to gate 102. Additionally, digital control device 105 may transmit a reply signal over control terminal 106 indicating the state of load transistor 101 or the unique address stored in ROM 108. By transmitting the state of load transistor 101, digital control device 105 may transmit the status of an attached indicator light. Preferably, digital control device 105 derives it power entirely from control line 31 by storing energy in a capacitor (not shown) when control terminal 106 is in a high logic state. An example of an addressable switch 100 that may be used in the file tracking system of the present invention is the DS2405 addressable switch available from Dallas Semiconductor, in Dallas, Tex.

Referring again to FIG. 3, branch control points 92a, 92b, ... 92n each include at least one branch control point switch assembly 93a, 93b, ... 93n including a branch control addressable switch 94a, 94b, ... 94n having a unique address associated therewith. Branch control point 92a may also include a branch indicator 95a, which includes a branch indictor light 96a, such as an LED, and a branch indicator addressable switch 97a having a unique address associated therewith to permit independent control of branch indicator light 96a by processor 20.

To communicate with file folder 74a located in a particular drawer 54a, processor 20 transmits a control signal over control line 31 via serial port adaptor 27 to control terminals 106 of all branch control addressable switches 94a, 94b, ... 94n connected to ground line 32. The transmitted control signal includes the unique address associated with branch control addressable switch 94a associated with drawer 54a with which communication is desired. The control signal also includes a command instructing this branch control addressable switch 94a to change to a conductive state thereby providing a connection between ground line 32 and addressable folder switch 76a. Subsequently, processor 20 may transmit control signals individually to addressable folder switch 76a by including the unique address associated therewith. Thus, processor 20 may illuminate folder indicator light 75a of any specified file folder within a specified drawer 54a. Additionally, processor 20 may obtain information from addressable folder switches 76a, 76b, ... 76n through a later described, deterministic process to determine the unique address stored in ROM 108 of each of addressable folder switches 76a, 76b, ... 76n. Processor 20 may also illuminate branch indicator light 96a by first transmitting a control signal including the unique address of branch control addressable switch 94a and subsequently transmitting a control signal including the unique address of branch indicator addressable switch 97a. By providing a branch indicator light 96a on a folder retainer such as a file drawer 54a, a file tray 40, or a shelving unit 60, one can quickly determine in which folder retainer a selected file folder 70 is located by looking for the folder retainer with the illuminated branch indicator light 96.

In the preferred embodiment, each file folder 70 has an addressable switch having a unique address associated therewith in any given system installation. In some applications, multiple file folders 70 could intentionally have identical addresses corresponding to files related or grouped in some fashion. Further, an inadvertent duplication of addresses could result in any installation from a finite number of addresses in a mass produced, manufacturing environment. In all such situations, unique addresses are still present as envisioned herein.

The manner in which contact can be made between the conductive strips on a file folder 70 and the conductive rails of a bus conductor 80 will now be described with reference to FIGS. 5–7.

Bus conductors 84a, 80b, 80c preferably include at least one ground conductive rail 82a, 82b, 82c, a control conductive rail 83a, 83b, 83c, and a support 84a, 84b, 84c for supporting the conductive rails. Support 84a, 84b, 84c preferably is formed of an electrically insulating material and supports the conductive rails in parallel with one another. Bus conductor 80a–80c may be formed as an integral part of a folder retainer or, alternatively, may be formed as a separate element which may be added to an existing folder retainer. As shown in FIG. 5, bus conductor 84a may be implemented in a vertically spaced, horizontally extending manner to provide contact along a vertical side, end, or back surface of a folder retainer. Thus, using bus conductor 84a, contact may be provided along the back of a shelving unit or bookcase or along the side of a file or desk drawer. Alternatively, as shown in FIG. 6, bus conductor 80b may be implemented such that contact is provided in a horizontally spaced, horizontally extending manner along a horizontal or bottom surface of a folder retainer. Horizontally extending bus conductor 80b is advantageous in that contact with the file folders is aided by gravitational forces and that contact may be made with either the edges of file folders vertically stacked thereon or with the large exterior surfaces of file folders laid flat thereon. Moreover, as shown in FIG. 7, bus conductor 80c may be implemented as a support rail in a file drawer 54 upon which hanging file folders 70c may be suspended. In such an implementation, file folder 70c does not require conductive strips, but rather a file folder indicator light assembly 71 is provided having a contact 78 for contacting control conductive rail 83c and a wire 77 connected to file folder hanger extension 74, which in turn contacts ground conductive rail 82c. However, hanging file folders 70c may still have such conductive strips to provide stackability and redundant contact through adjacent file folders as is later described.

Bus conductors 80 may optionally be disposed in more than one surface and in various combinations. For example, one conductive rail may be disposed on the bottom interior surface of a file drawer, while another conductive rail may be disposed on an interior side surface of the file drawer. Further, one conductive rail may be disposed on the side or bottom of a file drawer and another conductive rail may be disposed on a support rail, such as that shown in FIG. 7. Additionally, in a shelf or bookcase, one conductive rail could be disposed on a back surface and another could be disposed on a top surface of a shelf.

File folders 70a, 70b preferably include conductive strips including at least one return conductive strip 72a, 72b and a control conductive strip 73a, 73b arranged in a pattern that allows for relative movement between file folders or between the file folder and a bus conductor, such as that shown in FIG. 5 or that shown in FIG. 6. The conductive strips are preferably applied to both large exterior surfaces as well as made to extend around the side and bottom edges. By applying the conductive strip pattern to both large exterior surfaces of file folder 70a, 70b, 70c, a file-folder 70a, 70b, 70c that is not in direct contact with bus conductor 84a, 80b is nevertheless permitted to have a connection to bus conductor 84a, 80b via adjacent and intermediate file folders 70a, 70b, 70c. Thus, if too many file folders 70a, 70b, 70c are placed in a file drawer 54 such that a file folder 70a, 70b, 70c is laterally shifted and cannot directly contact bus conductor 84a, 80b a connection will be provided through adjacent file folders 70a, 70b, 70b. Similarly, file folders 70a, 70b, 70c stacked in a file tray 40 will have a connection to bus conductor 80a, 80b via file folders 70a, 70b, 70c positioned therebetween.

As shown in FIG. 5, file folder 70a has at least one large exterior surface having a top and bottom edge as well as left and right side edges. The conductive strip pattern shown thereon includes three conductive strips (i.e., conductors)— one control conductive strip 73a and two return conductive strips 72a. The control conductor 73a is "V" shaped and includes a first conductive linear strip 73a' extending from the left edge of the surface to a central point on the bottom edge of the surface and a second conductive linear strip 73a" extending from the central point on the bottom edge of the surface to the right edge of the surface. A first one of the return conductors 72a includes a linear strip 72a' extending in parallel to the first conductive linear strip 73a' of the control conductor 73a from the left edge of the surface to the bottom edge of the surface. The other one of the return conductors 72a includes a linear strip 72a" extending in parallel to the second conductive linear strip 73a" of the control conductor 73a from the bottom edge of the surface to the right edge of the surface. The linear strips of the two return conductors 72a are positioned an equal distance on opposite sides of the control conductor 73a. Preferably, the same conductive strip pattern is applied to the back or other exterior surfaces of file folder 70a.

As shown in FIG. 6, file folder 70b also has at least one large exterior surface having a top and bottom edge as well as left and right side edges. The conductive strip pattern shown thereon includes three conductive strips-one control Conductive strip 73b and two return conductive strips 72b. The control conductor 73b consists of a conductive linear strip extending from the top edge of the surface to a bottom edge. The return conductors 72b are formed of two linear strips 72b' and 72b', each extending in parallel to the conductive linear strip of the control conductor 73b, from the top edge to the bottom edge. The two linear strips 72b',72b' constituting the return conductors 72b are positioned an equal distance on opposite sides of the control conductor 73b. Preferably, the same conductive strip pattern is applied to the back or other exterior surfaces of file folder 70b.

The conductive strip patterns shown in FIGS. 5 and 6 permit proper electrical contact even when the file folders 70a, 70b are rotated 180° about the illustrated y axis, which parallels the left side edges of the file folders, relative to one or more adjacent file folders or relative to bus conductor 84a, 80b. The conductive strip pattern shown in FIG. 5 may be utilized with either of the bus conductors 84a, 80b shown in FIGS. 5 and 6 because the strips overlap or extend around both the bottom and side edges of the file folder and permit proper electrical contact even when a file folder 74a is rotated 90° about the z axis, which is orthogonal to the large exterior surfaces of file folders 70a, 70b, with respect to adjacent file folders or bus conductor 84a, 80b. Further, the conductive strip pattern shown in FIG. 5 permits contact when laid flat on an adjacent file folder or an appropriately arranged bus conductor.

The conductive strip pattern shown in FIG. 6 is similarly advantageous in that proper electric contact may be made regardless of whether contact is made with the edge of file folder 70b or with the entire surface of file folder 70b should file folder 70b be laid flat on conductive bus 80b. Thus, with respect to bus conductor 80b or an adjacent file folder, file folder 70b may be rotated 180° about the x, y, and z axes, and further may be rotated 90° about the x axis, which parallels the bottom edges of file folders 70a, 70b, without disrupting the electrical contact between bus conductor 80b and the conductive strips. Additionally, the conductive strip pattern shown on file folder 70b permits file folders 70b to be significantly laterally shifted in the y direction relative to one another while still maintaining the necessary contact.

Hence, the conductive strip patterns are configured to electrically connect an addressable folder switch 76 with electrical contacts of the file tracking system when the file folder is positioned in any one of several different positions that allow a proper connection to be made. Further, the conductive strip patterns are configured to electrically connect an addressable folder switch 76 with the file tracking system when the file folder 70 is positioned in (1) any one of several different orientations with respect to the electrical contacts of the electronic file tracking system; (2) any one of several different lateral positions with respect to an adjacent file folder; or (3) any one of several different rotated positions with respect to an adjacent file folder. Additionally, the conductive strip pattern is preferably configured to electrically connect the addressable folder switch 76 to the file tracking system at a plurality of locations on the file folder 70.

The conductive strips may be formed of conductive tape, fabric, coating, which may be a conductive ink or polymer, or other suitable conductive materials. The choice between such materials being a factor of the shape and composition of the particular file folder, cost and longevity goals, and other concerns.

As evident from the foregoing description of the bus conductors and the conductive strip patterns applied to the file folders, the file tracking system of the present invention offers exceptional flexibility, both in design and in use.

Having described the preferred structure of the first embodiment of the present invention, the operation of file tracking system 10 will now be described with reference to FIGS. 8–13.

Figure 8:
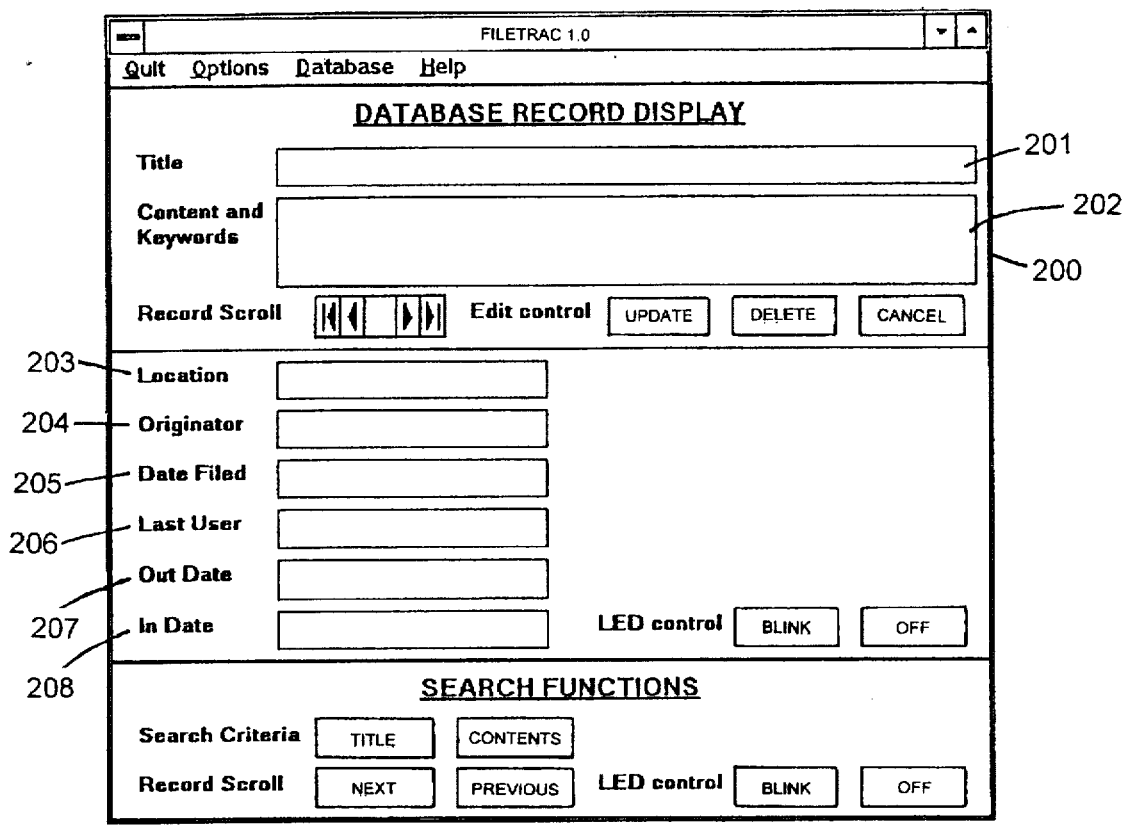
FIG. 8 is a graphic view of a main user interface window of the file tracking system of the present invention.

FIG. 8 shows a main user interface window 200 that a user would see on display 22 of processor 20. Main user interface window 200 indicates the title 201 of a file identified in the database, the content and keywords of the file 202, the location of the file 203, the originator of the file 204, the date the file was filed in the system 205, the name of the last user of the file 206, the date the file was last removed from the system 207, and the date the file was returned to the system 208. The database may store additional information for display to the user. For example, the database may store the locations in a computer network where any redundant copies of the file are stored.

The software utilized in file tracking system 10 generally includes a user interface module for providing windows, dialog boxes, and menus, such as window 200. Preferably, the user interface module operates in a graphic user interface such as Windows® software available from Microsoft Corporation. The software also includes several standalone event subroutines that are executed when their associated controls are activated by a user for for timed events, at the configured intervals. The event subroutines may be classified into four main functional groups:

a database interface; a bus interface; option control; and Debug control.

The database interface subroutines provide the viewing, editing, and search capability for the file folder records. The viewing controls allow movement through the database records and the display of record fields. The editing controls allows the entry, deletion, and updating of database records. The search controls let the user locate records by value within the title or content\keyword field, and the viewing of the searched group.

The bus interface subroutines compile and issue control signals over bus 30 to the various branch control point switch assemblies 93 and file folders 70 on the system. An example of an interface for a single pair bus having addressable switches 100 connected thereto is TMEX™ interface available from Dallas Semiconductor, Dallas, Tex. Preferably, the bus interface includes functions to staff and stop a communication session, identify attached devices, and the sense and control the functioning of the addressable switches.

The option control subroutines allow the user to adjust the indicator light blink rate, the indicator light ON duration, bus scan rate, device persistence, and form display to include debug information. A user may set the indicator light blink rate and the bus scan rate by defining the period between their events, which is the interval property of their timer control. The user may set the device persistence in increments of bus scan rate and controls the length time that passes before processor 20 considers a missing file folder device to be removed. This persistence compensates for intermittent contacts during file folder movement. The debug information includes a status window used to display program messages, access to debug controls, and database fields not normally of interest to the user such as state variables and the unique address associated with the device.

Figure 9:
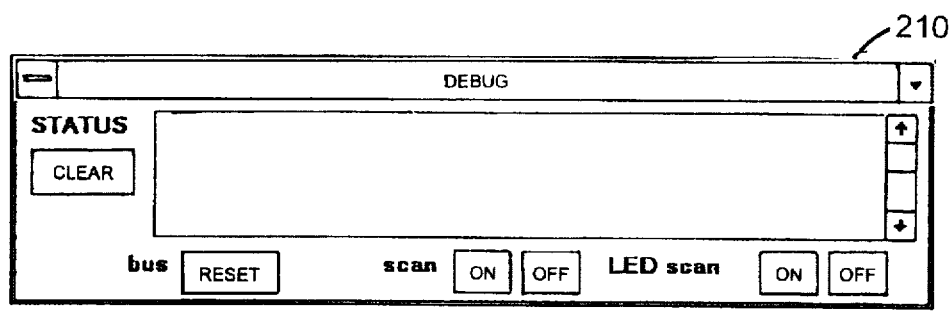
FIG. 9 is a graphic representation of a debug window of the file tracking system of the present invention.

The debug controls allow the status messages to be cleared, the bus to be reset, and the scan timers to be enabled/disabled. FIG. 9 shows a debug window 210 illustrating the manner in which the user interface presents the debug controls to a user.

The operations described below, utilize various combinations of the event subroutines described above. Thus, any given operation may include one or more data interface subroutine, bus interface subroutine, option control subroutine, and/or debug control subroutine.

Figure 10:
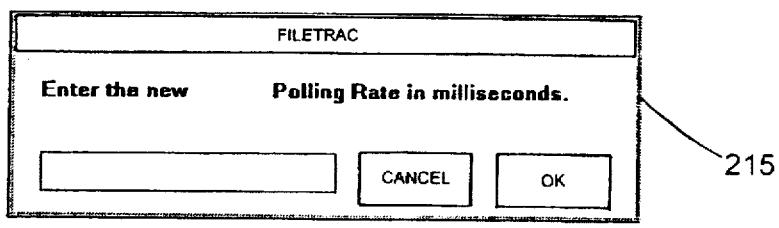
FIG. 10 is a graphic representation of a Get Number dialog box of the file tracking system of the present invention.

FIG. 10 shows a polling rate request window 215, which allows a user to adjust the rate at which file tracking system 10 polls the file folders located within the system. A user may display the polling rate request window 215 by selecting the "Options" menu on main user interface window 200.

With the exception of the ability to adjust the polling rate, processor 20 generally polls file folders 70 and maintains the database transparently to the users. The manner by which processor 20 periodically polls file folders 70 will be described with reference to the flow charts shown in FIGS. 11 and 12.

Polling (Step 300) occurs periodically at the rate established by the user in polling rate request window 215. Initially, processor 20 executes a scan of a main branch looking for new, reconnected, and removed branch control point switch assemblies 93 (Step 302). The manner by Which processor 20 performs this operation is shown in the flow chart in FIG. 12.

Processor 20 initiates a scan 302, 330 by opening communication with the desired main branch 98 (FIG. 2) (Step 304). Then processor 20 attempts to detect the presence of a device (in this case a branch controller addressable switch) (Step 306). By a process of elimination, processor 20 may determine the unique address of any newly detected branch controller addressable switch 94 and store the unique address in the database. If a branch controller addressable switch 94 is found, processor 20 queries whether branch controller addressable switch 94 is new by accessing the database and determining whether a branch controller addressable switch 94 having the received unique address was previously registered therein (Step 308). If the branch controller addressable switch 94 detected is new, processor 20 adds the branch controller addressable switch 94 to the database and automatically fills in whatever fields can be filled in with the information that may be obtained such as the location of branch controller addressable switch 94 (Step 310).

To determine the unique address of devices, such as addressable folder switches 76 and branch controller addressable switches 94, located on a given branch, processor 20 issues a command instructing the addressable folder switches 76 and branch controller addressable switches 94 to transmit the unique address stored in ROM 108 bit by bit. When a plurality of devices are present on the activated branch, each of them simultaneously transmits the first bit of the unique address on bus 30. Processor 20 senses the state of bus 30, which represents a logical AND of all the first bits of each device located on the activated bus. Processor 20 then issues a command to each device to transmit the complement of the first bit of their respective unique address. If processor 20 detects two "0's" in response to these two inquires, processor 20 determines that there are devices located on the branch that have a "0" in the first bit position and other devices having a "1" in the first bit position. If all devices had a "0" in the first bit position, the reading would have been a "0" followed by a "1". If a "1" followed by a "0" were received, processor 20 determines that all the present devices have a "1" in the first bit position. Last, if processor 20 detects two "1's", no devices are present on the activated branch.

The above procedure for identifying unknown devices on a branch may be further optimized by first disabling all known devices on the branch and then performing the operation on those devices that are not disabled. In the illustrated embodiment, such procedure is carried out using the SearchROM command included with the TMEX Software from Dallas Semiconductor.

Processor 20 then issues a control signal including one of the "1" or "0" logic values in the first bit position in order to disable the devices that do not have this logic value in the first bit position of their unique address. Processor 20 then issues a command to the devices that remain enabled requesting these devices to transmit the second bit of their unique addresses and the complement thereof. Processor 20 then uses the same process to determine the value of the second bit of at least one of the remaining devices. Processor 20 repeats the above steps until the unique address of one of the devices is known.

Subsequently, processor 20 reactivates the other devices on the activated branch and repeats the above process using a different logic level at the highest bit position where processor 20 was able to determine that a single device remained. In this manner, processor 20 determines the unique address of each file folder 70 and branch controller 93 located on an activated branch.

After the new branch controller addressable switch 94 has been added to the database, processor 20 scans the rest of main branch 98 looking for additional branch controller addressable switches 94 (Step 306). If processor 20 detects a branch controller addressable switch 94 on the main branch 98 that is not new, processor 20 compares the branch controller state and location with that previously stored in the database and updates the database if any changes are detected (Step 312). Processor 20 continues to search for additional branch controller addressable switches 94 on main branch 98 until no further branch controller addressable switches 94 are detected in Step 306.

When processor 20 determines that no further branch controller addressable switches 94 are present on main branch 98, processor 20 closes communication with main branch 98 (Step 314). Next, processor 20 queries the database for the number of branch controller addressable switches 94 presently registered in the database as being located on main branch 98 (Step 315) and compares this number with the number of branch controller addressable switches 94 that processor 20 detected in Step 306 while scanning main branch 98 (Step 316). If the number of branch controller addressable switches 94 presently registered exceeds the number of branch controller addressable switches 94 detected, processor 20 determines that at least one branch controller addressable switch 94 has been removed from main branch 98.

To verify that a branch controller addressable switch 94 has been removed, processor 20 reopens communication with main branch 98 (Step 318) and transmits control signals to each branch controller addressable switch 94 registered in the database by including the unique address thereof in the control signal, which is stored in the database (Step 320). If a branch controller addressable switch 94 fails to respond to the control signal sent by processor 20, processor 20 changes the state of the branch controller addressable switch 94 registered in the database to "timing out" (Step 322). After processor 20 transmits a control signal to each registered branch controller addressable switch 94, processor 20 closes communication with main branch 98 (Step 324).

After processor 20 has closed communication with the reopened main branch 98 in Step 324 or after processor 20 has determined that the number of branch controller addressable switches 94 registered in the database does not exceed the number of branch controller addressable switches 94 detected in Step 316, processor 20 queries the database for the identity and unique address of all present branch controller addressable switches 94 on the main branch 98 (Step 326 in FIG. 11) and changes the state of addressable branch controller switches 94 to conducting one at a time in order to activate each secondary branch 99 (Step 328).

While a branch controller addressable switch 94 is conducting, processor 20 scans the activated branch for new, replaced, or removed file folders 70 contacting the activated branch (Step 330). The manner by which processor 20 performs this operation is shown in the flow chart in FIG. 12.

First, processor 20 opens communication with the desired secondary branch 99 (Step 304). Then processor 20 attempts to detect the presence of a device (in this case a file folder 70) (Step 306). If a file folder 70 is found, processor 20 queries whether file folder 70 is new by accessing the database and determining whether file folder 70 was previously registered therein (Step 308). If the file folder 70 detected is new, processor 20 adds file folder 70 to the database and automatically fills in whatever fields can be filled in with the information that may be obtained (Step 3 10). By the process of elimination, processor 20 may determine the unique address of any newly detected addressable file folder switch 76 and store the unique address in the database. After the new file folder 70 has been added to the database, processor 20 scans the rest of the opened secondary branch 99 looking for additional file folders 70 (Step 306).

If processor 20 detects a file folder 70 on the opened secondary branch 99 that is not new, processor 20 compares the file folder state and location with that previously stored in the database and updates the database if any changes are detected (Step 312). Processor 20 continues to search for additional file folders 70 on secondary branch 99 until no further file folders 70 are detected in Step 306.

When processor 20 determines that no further file folders 70 are present on the opened secondary branch 99, processor 20 closes communication with this-secondary branch 99 (Step 314). Next, processor 20 queries the database for the number of file folders 70 presently registered in the database as being located on this secondary branch 99 and compares this number with the number of file folders 70 that processor 20 detected in Step 306 while scanning the secondary branch 99 (Step 316). If the number of file folders 70 presently registered exceeds the number of file folders 70 detected, processor 20 determines that at least one file folder 70 has been removed from the opened secondary branch 99.

To verify that a file folder 70 has been removed, processor 20 reopens communication with the secondary branch 99 (Step 318) and transmits control signals to each file folder 70 registered in the database by including the unique address thereof in the control signal, which is stored in the database (Step 320). If a file folder 70 fails to respond to the control signal sent by processor 20, processor 20 changes the state of the file folder 70 registered in the database to "timing out" (Step 322). After processor 20 transmits a control signal to each registered file folder 70, processor 20 closes communication with this secondary branch 99 (Step 324).

Figure 11:
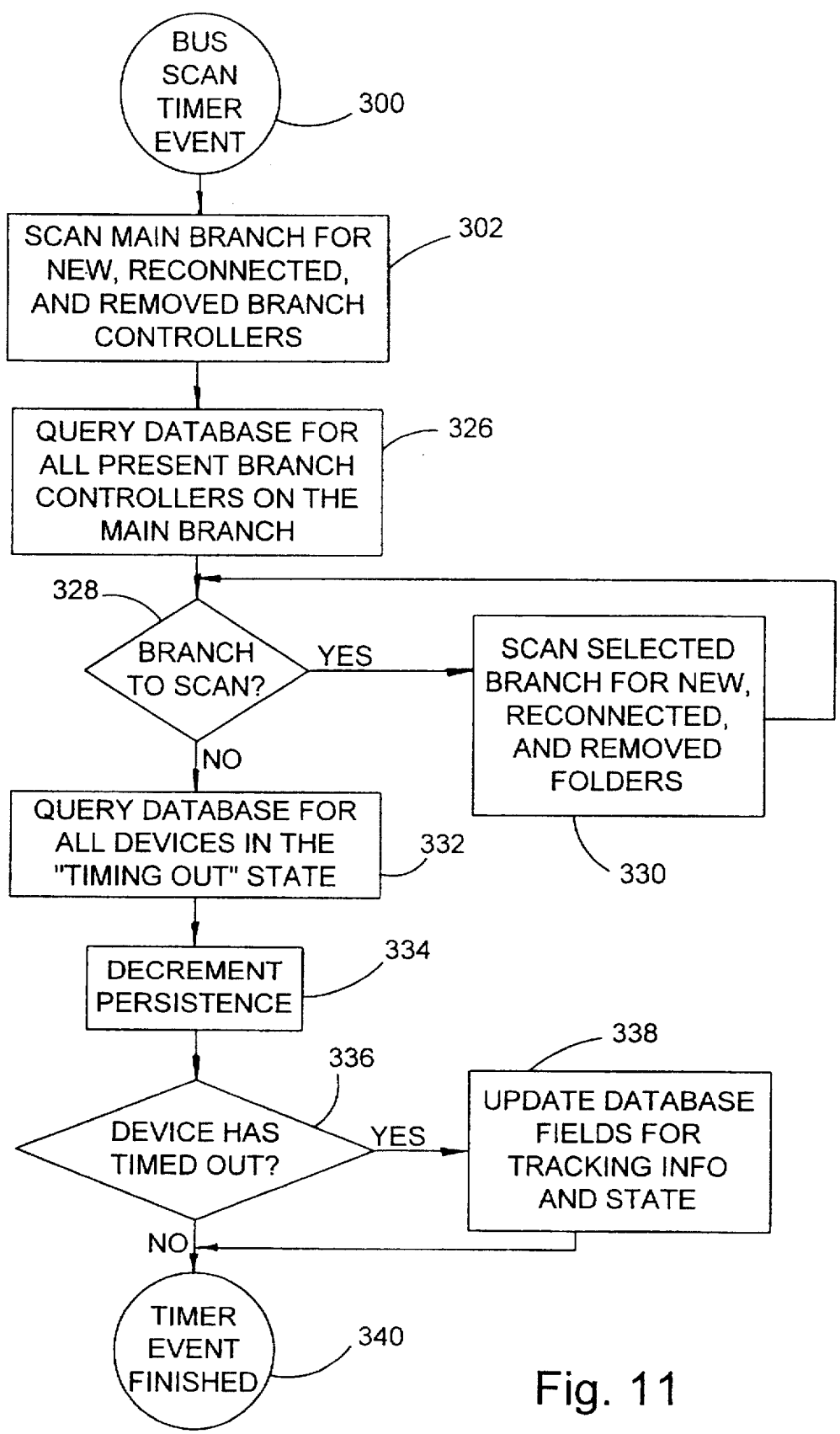
FIG. 11 is a flow chart illustrating the polling operation of the file tracking system of the present invention.
Figure 12:
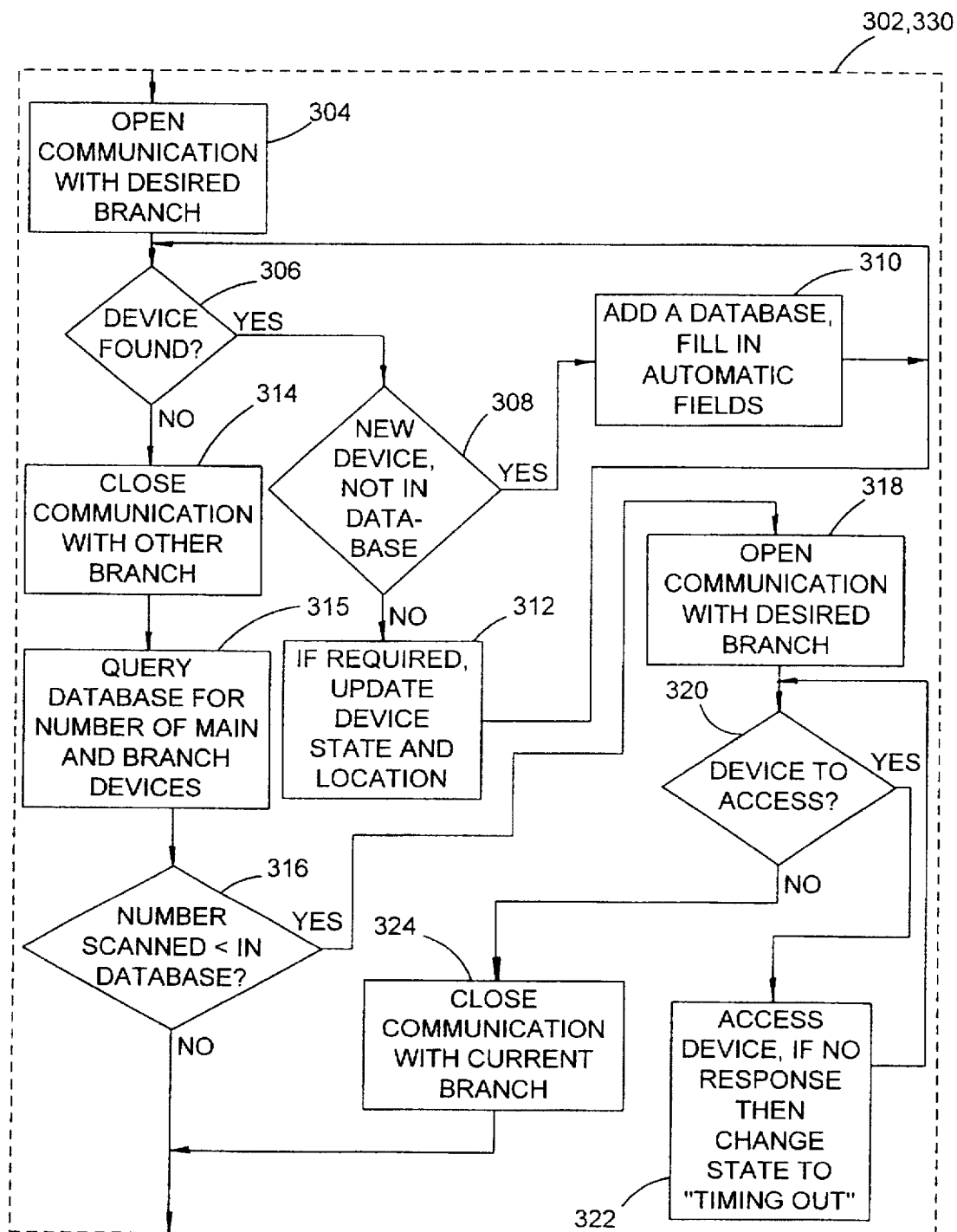
FIG. 12 is flow chart showing the device scanning operation of a subroutine executed by the file tracking system of the present invention.

After processor 20 has closed communication with the reopened secondary branch 99 in Step 324 or after processor 20 has determined that the number of file folders 70 registered in the database does not exceed the number of file folders 70 detected in Step 316, processor 20 activates another secondary branch 99 by transmitting a control signal including the unique address of the branch controller addressable switch 94 associated with the selected secondary branch 99 (Step 328 in FIG. 11).

After processor 20 has scanned all the secondary branches 99, processor 20 queries the database for the identity of all devices in the "timing out" state (Step 332) and decrements the persistence values stored in association therewith (Step 334). The persistence value indicates the number of additional times that processor 20 will perform a scan of all file folders 70 before a file folder having a "timing out" status will be considered to have a "timed out" or removed status. When a file folder has "timed out" (Step 336), processor 20 updates the database to indicate this change in status (Step 338) and ends the scanning operation (Step 340). Once the scanning operation is finished, a timer is started to determine when the next scanning operation is to be performed.

Processor 20 automatically updates the database by inserting the date and time the file was detected as having been removed from the system into the appropriate database fields associated with file folder 70. Additionally, processor 20 may identify the individual who removed file folder 70 by determining who was the last individual to log onto the system and cause the indicator light of the removed file folder to blink. This is especially helpful in locations where security measures require logging onto the system before removing files. Then, if the presence of the removed file folder 70 is subsequently detected at a different location, such as on an individual's desk, processor 20 may update the database to indicate that the individual who removed the file is the individual associated with the location (i.e., desk) where file folder 70 was subsequently detected or have a separate field corresponding to the individual responsible for that particular area or location.

By actively polling each file folder 70, file tracking system 10 maintains an accurate record of file folder location and usage history without requiring action by office personnel. Moreover, office personnel need not spend their valuable time keeping the files organized. Using file tracking system 10, a person may quickly determine the present location of a file folder and cause LEDs on the file folder and file cabinet drawer to blink to allow the person to quickly identify the requested file folder. Because of the ease by which a person may locate a file folder, office personnel may place the file folders anywhere and in any convenient order. Thus, office personnel may place the most frequently used file folders at the front of a file drawer where they are more easily accessed at a later time. Furthermore, because new file folders may be placed in any file drawer or on any shelf, there is no need to rearrange the file folders to make room for new file folders.

In addition, by utilizing a database to index file folders, the file folders may be physically grouped or classified into various topical groups and subgroups. Thus, a user may access all the file folders constituting the group or subgroup. Moreover, by issuing an appropriate command, a user can cause the indicator lights on all the file folders of a selected group of file folders to blink thereby adding to the ease by which the user can locate the physical file copies for immediate use or to gather for placement into a desired storage pattern or location. Similarly, a user can locate all files mentioning a particular subject by performing a keyword search. Thus, the present invention may provide higher levels of file organization even if a user wishes to maintain the files in a specific nonrandom order.

Figure 13:
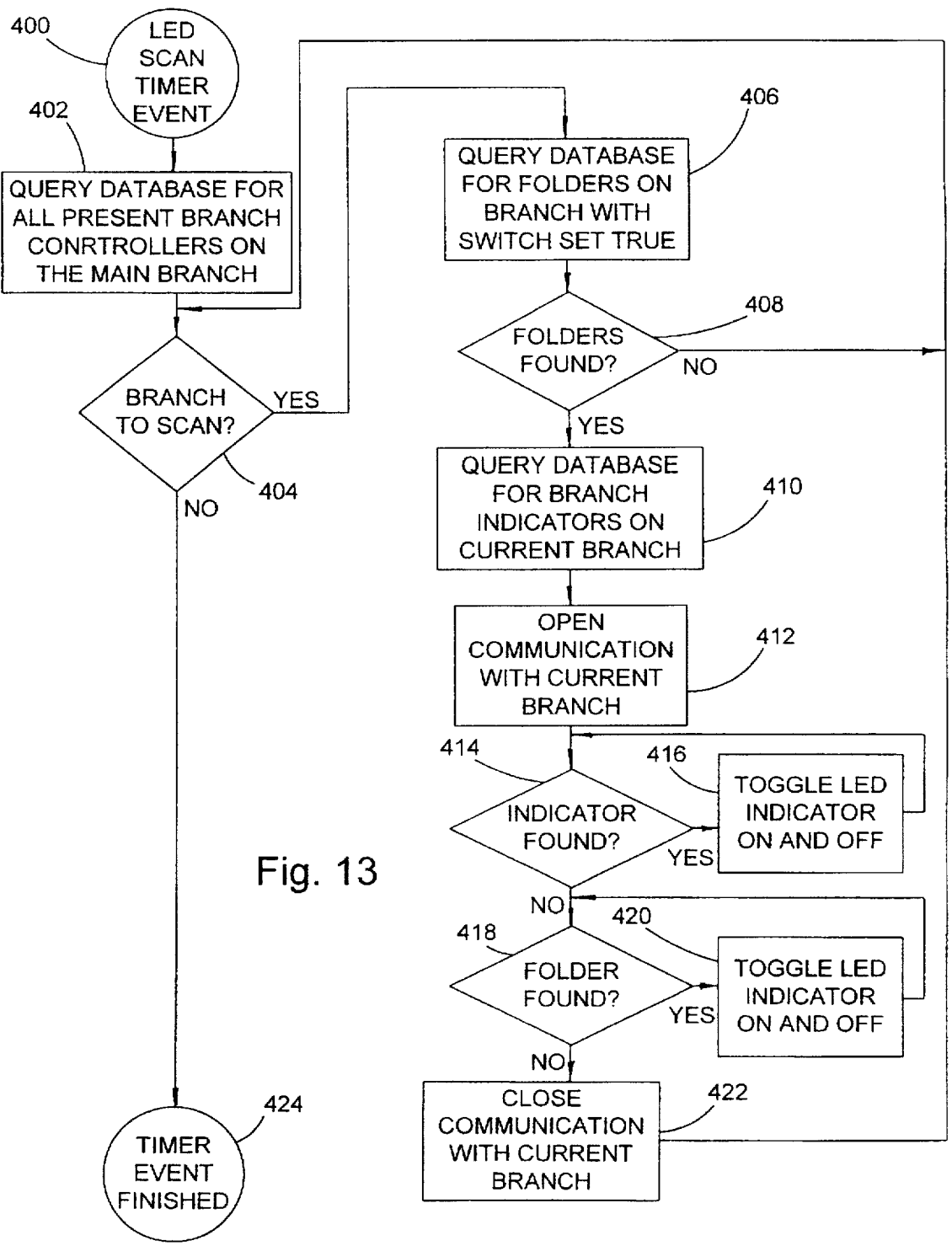
FIG. 13 is a flow chart showing the indicator light scanning operation of the file tracking system of the present invention.

FIG. 13 is a flow chart illustrating the operation of file tracking system 10 when operating in an indicator light scanning operation. As will be apparent from the following description, the indicator light scanning operation is useful for causing the indicator lights on the selected file folders and branch indicators to blink.

An indicator light scanning operation is performed at timed intervals (Step 400). Processor 20 begins the operation by querying the database for all present branch controller addressable switches 94 on the main branch (Step 402). Then, for each branch controller addressable switch 94 that is present (Step 404), processor 20 queries the database for file folders 70 having an indicator light blink flag set to logic "1" and located on the branch controlled by the selected branch controller addressable switch 94 (Step 406). The indicator light blink flag for a file folder is set when a user requests processor 20 to blink the indicator light of a selected file folder. If no file folders are found that are connected to the selected branch (Step 408) and have their indicator light blink flag set to "1", processor 20 selects the next branch (Step 404). If the processor 20 finds file folders 70, processor 20 queries the database for branch indicators on the selected branch (Step 410), then processor 20 opens communication with the selected branch (Step 412) and transmits control signals to each branch indicator 95 that is found on the selected branch (Step 414) causing the branch indicator lights 96 to toggle on and off (Step 416). Next, processor 20 transmits control signals to each file folder 70 that is found on the selected branch having its indicator light blink flag set to "1" (Step 418) causing the folder indicator lights 75 to toggle on and off (Step 420). After all of the folder indicator lights 75 on the selected branch have been toggled, processor 20 closes the selected branch (Step 422) and selects the next branch (Step 404). The process is repeated until there are no more branches to select (Step 424). This procedure may be programmed to be executed several times per second.

The control signals transmitted by processor 20 to toggle the indicator lights may include a first control signal containing the unique address of the addressable device followed by a second transmitted control signal including a command to toggle the indicator light. Alternatively, the control signals may include a single control signal transmitted by processor 20 that includes both the unique address and the command to toggle the indicator light.

Although the above procedure is presently used to blink the indicator lights, it is also possible to utilize indicator lights that blink upon receiving an instruction to do so until a subsequent instruction is received to stop blinking. Further, processor 20 may read each indicator for the status of the indicator light prior to issuing a control signal causing the indicator light to blink in order to ensure that the indicator light is not already turned on.

Figure 14:
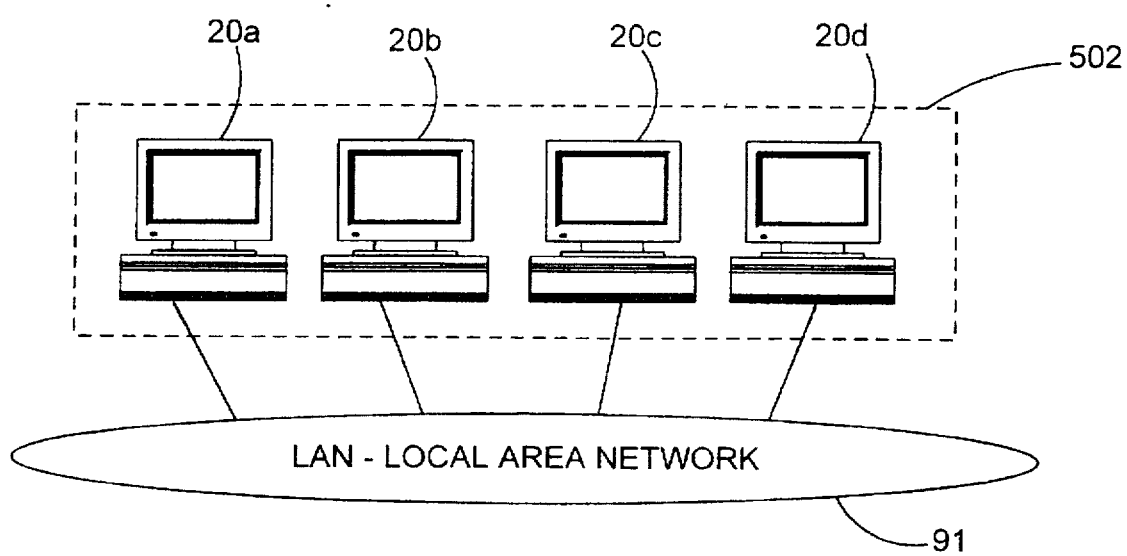
FIG. 14 is a pictorial view of a file tracking system constructed in accordance with a second embodiment of the present invention.

FIG. 14 shows a file tracking system 500 constructed in accordance with a second embodiment of the present invention.

The second embodiment of the file tracking system 500 differs from the first embodiment only in that file tracking system 500 includes a plurality of processors 20a–20d interconnected by a network, such as a local area network (LAN) 91 or a local office network (LON). An example of a LON in which the present invention may be implemented is disclosed in U.S. Pat. No. 5,530,435, the disclosure of which is incorporated by reference herein. Each processor may store a portion of the entire database of the system such that the various processors and their respective portions of the database constitute a distributed database system 501. In such a system any one of processors 20a–d may access the database stored in any other processor using a conventional distributed database management system (DDBMS), a networked database server, or through database information stored with the file folder.

The DDBMS architecture of tracking system 500 allows any single file tracking program to operate on records that are spread across multiple databases that are running on a variety of different processors and operating systems connected through a variety of communication networks. In a networked database server, a single processor maintains a central database with the other processors having a subset copy of the records pertaining to the file folders local to each processor. A processor would use this local copy to monitor the file folder state and indicator light state, and relay only changes in state back to the central database.

By scaling the file tracking system of the present invention to permit multiple access to the system at various locations, file tracking system 500 permits multiple users in various locations to locate file folders that are in distributed locations about the organization. Thus, this system can easily be adapted for use in a large organization having numerous office buildings in which file folders may be located in any office or file repository of these office buildings.

Figure 15:
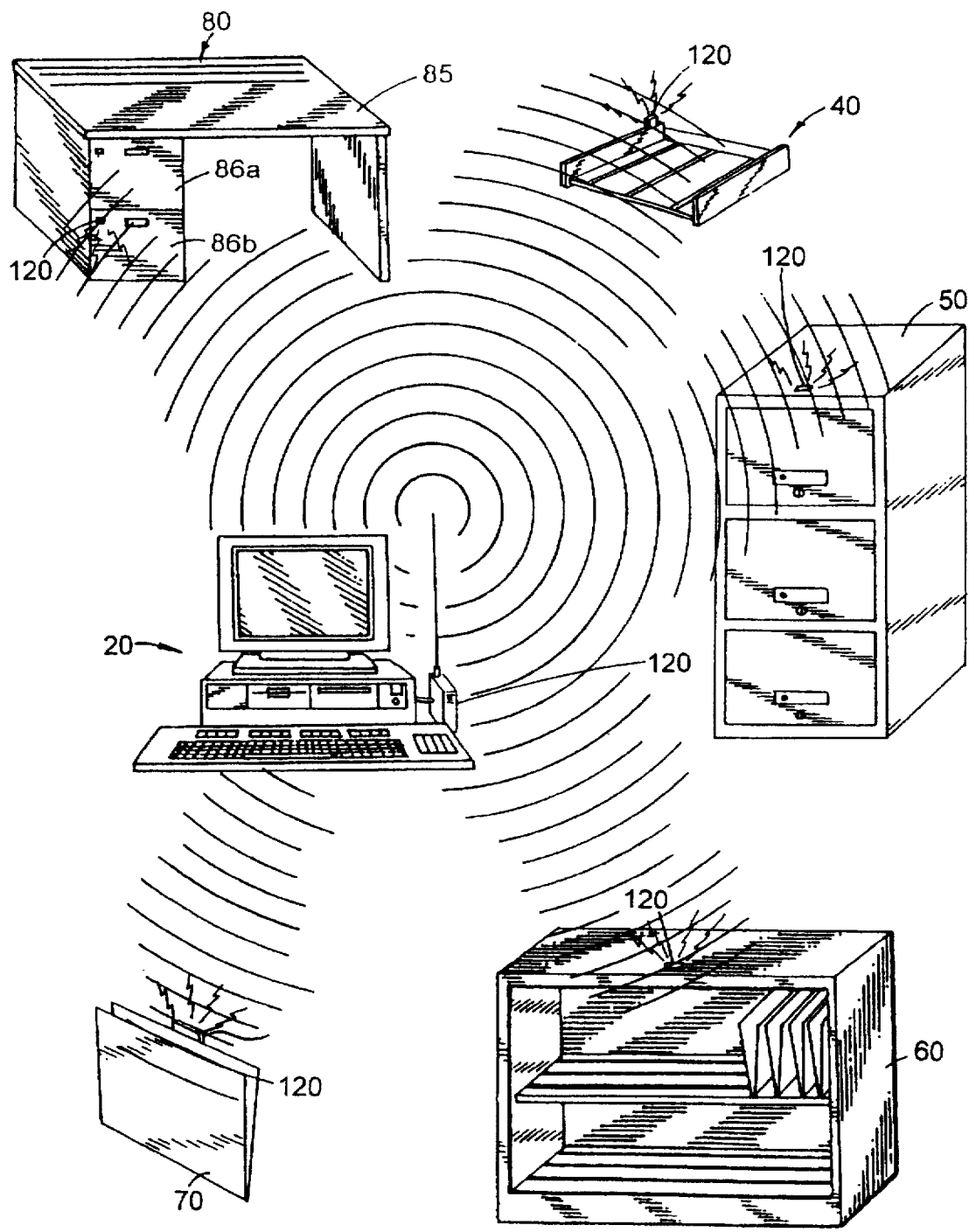
FIG. 15 is a pictorial view of a file tracking system constructed in accordance with a third embodiment of the present invention.

Although the above embodiments of the present invention have been described as using physical connections between the various elements, any one or all of the above connections may be replaced with a radio link by providing a radio frequency (RF) transceiver connected to processor 20 and RF transceivers on the folder retainers and/or the file folders themselves. FIG. 15 shows a third embodiment using RF signals. The third embodiment differs from the second embodiment in that RF transceivers 120 are connected to processor 20 and either to each file folder 70 or to each folder retainer, which refers to tray 40, file cabinet 50, shelving unit 60, and desk drawer 86. The third embodiment may utilize the same RF communication protocols as used in cellular telephones. For example, the system may employ cellular digital packet protocol (CDPP) or the protocol used for personal communication systems (PCS). These protocols may be employed by utilizing branch controllers as a cell base station whereby file folders located within each cell register with the closest cell base station such that processor 20 may track the location of each file folder.

Although the embodiment shown illustrates a system utilizing all RF links from processor 20, a combination of Rb links and physical bus connections may also be employed. By providing the availability of radio links, mobile folder retainers, such as file carts, as well as remotely located folder retainers may be employed in the file tracking system of the present invention.

Although the processor(s) of the present invention have been described with reference to personal computers, the processor may be a processor embedded in or near the folder retainer. In such an arrangement, it may be preferable for the embedded processor to include a plurality of serial ports to which different branches of the bus may be connected, thus, eliminating the need for a number of branch controllers. Further, the processors may be computer terminals connected to a network.

Further, processor 20 may be implemented in either a single processing unit or in a distributed system whereby various tasks performed by processor 20 are allocated to various components of the distributed system. For example, one component may be responsible for scanning the bus, while another may be used to provide an interface with the users. Further, various tasks described above as being performed by processor 20 may be allocated to embedded processor 27. For example, embedded processor 27 may maintain separate databases identifying which file folders are located on their associated branch.

Additionally, other types of annunciators or, as more broadly defined herein, file locating devices, such as an audible alarm, may supplement or replace the visual indicator lights used in the file tracking system.

Although it is preferable that the present invention be practiced using addressable devices that each have a unique addresses associated therewith, it is possible that in a system employing a large number of addressable devices, two or more addressable devices could have the same address. The present claims are intended to cover the situation where at least a plurality of addressable devices have unique addresses. To ensure such coverage, some claims below recite that the addressable devices have a substantially unique address.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The embodiments of the invention in which an exclusive property or privilege is claimed are defined as follows:

1. A file folder for use in a file tracking system having a processor adapted to provide control signals to a file folder when disposed in a folder retainer, the file folder comprising:
   at least one surface;
   an addressable device carried by the file folder and having an address;
   a first conductor on said surface electrically coupled to said addressable device for providing control signals to said addressable device when said file folder is placed in a folder retainer, said first conductor adapted to communicatively couple to the processor of the file tracking system, the control signals being provided by the processor; and
   a second conductor on said surface for providing a return path from said addressable device; and
   said first and second conductors are disposed in a pattern that allows for conductive contact between adjacent file folders when said adjacent file folders are in any one of a plurality of different positions.

2. The file folder of claim 1, wherein
   said first conductor includes
      a first linear strip extending from a first edge of said surface to a central point on an adjacent second edge of said surface, and
      a second linear strip extending from said central point on said second edge of said surface to a third edge of said surface, which is opposite said first edge and adjacent said second edge; and
   said second conductor includes
      a first linear strip extending in parallel to said first linear strip of said first conductor from said first edge of said surface to said second edge of said surface, and
      a second linear strip extending in parallel to said second linear strip of said first conductor from said second edge of said surface to said third edge of said surface, said first and second linear strips of said second conductor are positioned an equal distance on opposite sides of said first conductor.

3. The file folder of claim 1, wherein said first conductor is a linear strip extending from one edge of said surface to an opposite edge of said surface, said second conductor is formed of two linear strips, each extending in parallel to said first conductor from said one edge of said surface to said other edge of said surface, and wherein the two linear strips of said second conductor are positioned an equal distance on opposite sides of said first conductor.

4. The file folder of claim 1, wherein said plurality of different positions are determined relative to an adjacent file folder.

5. The file folder of claim 1, wherein said plurality of different positions are determined relative to a folder retainer.

6. The file folder of claim 1, wherein the folder retainer is a drawer of a filing cabinet, and one of said plurality of different positions of said adjacent file folders is hanging in the drawer.

7. The file folder of claim 1, wherein one of said plurality of different positions of said adjacent file folders is a stacked position with each file folder stacked vertically upon another file folder whereby said pattern of said first and second conductors allows for conductive contact between such vertically stacked adjacent file folders.

8. A file folder for use in an electronic file tracking system having electrical contacts, comprising:

a folder adapted to contain media therein;

an addressable device located on said folder, said addressable device being adapted to communicate electrically with the electronic file tracking system; and a conductor located on said folder and configured so as to electrically connect said addressable device to the electrical contacts of the electronic file tracking system when said folder is positioned in any one of several different positions.

9. The file folder of claim 8, wherein said conductor is configured to cl electrically connect said addressable device to the electrical contacts of the electronic file tracking system when said folder is positioned in any one of several different orientations with respect to the electrical contacts.

10. The file folder of claim 8, wherein said conductor is configured to electrically connect said addressable device to the electrical contacts of the electronic file tracking system when said folder is positioned in any one of several different positions with respect to an adjacent file folder.

11. The file folder of claim 10, wherein said conductor is configured to electrically connect said addressable device to the electrical contacts of the electronic file tracking system when said folder is positioned in any one of several different rotated positions with respect to an adjacent file folder.

12. The file folder of claim 8, wherein said conductor is configured to electrically connect said addressable device to the electrical contacts of the electronic file tracking system at a plurality of locations on said folder.

13. The file folder of claim 12, wherein at least one of said plurality of locations is a side surface of said folder.

14. The file folder of claim 12, wherein at least one of said plurality of locations is an edge surface of said folder.

15. The file folder of claim 12, wherein one of said plurality of locations is a side surface of said folder and another one of said plurality of locations is an edge surface of said folder.

16. A file folder for use in an electronic file tracking system having a source of power and means for generating control signals, comprising:

a folder adapted to contain media therein and having at least one surface;

an addressable device located on the folder, said addressable device having an input terminal for receiving both power and control signals from the electronic file tracking system;

a first conductor on said surface for removably coupling said input terminal of said addressable device to both the source of power and the means for generating control signals located apart from the folder in the electronic file tracking system when said file folder is placed in a folder retainer; and a second conductor on said surface for providing a return path from said addressable device, said first and second conductors are disposed in a pattern that allows for conductive contact between adjacent file folders.

17. The file folder of claim 16, wherein said file folder further includes an indicator light located on said folder, and wherein said addressable device is adapted to transfer power to said indicator light from the source of power in the electronic file tracking system.

18. A file folder for use in a file tracking system having a processor adapted to provide control signals to a file folder when disposed in a folder retainer, the file folder comprising:

a folded substrate for holding media, said folded substrate having at least one generally planar exterior surface;

an addressable device carried by the file folder and having an address;

a first conductor on said exterior surface electrically coupled to said addressable device for providing control signals to said addressable device when said file folder is placed in a folder retainer, said first conductor adapted to communicatively couple to the processor of the file tracking system, the control signals being provided by the processor; and a second conductor on said exterior surface for providing a return path from said addressable device.

19. The file folder of claim 18, wherein the folder retainer includes a first conductive rail for providing control signals from the processor and a second conductive rail for providing a ground, and wherein said addressable device is connected to receive control signals from the processor and a ground from the second conductive rail when (1) said first and second conductors directly contact the first and second conductive rails, respectively, or (2) said first and second conductors of the file folder indirectly contact said first and second conductive rails through first and second conductors of another file folder placed in the folder retainer.

20. The file folder of claim 18, further including an indicator connected to said addressable device, wherein said addressable device is an addressable switch and said indicator is activated whenever the processor transmits a control signal to said addressable switch that includes the address corresponding to said addressable switch.

21. The file folder of claim 20, wherein said indicator is an indicator light.

22. The file folder of claim 20, wherein said indicator is an audible alarm.

23. The file folder of claim 18, wherein said first and second conductors include strips of conductive tape provided on said exterior surface of the file folder.

24. The file folder of claim 18, wherein said first and second conductors include strips of conductive fabric provided on said exterior surface of the file folder.

25. The file folder of claim 18, wherein said first and second conductors include strips of conductive coatings provided on said exterior surface of the file folder.

26. The file folder of claim 25, wherein said conductive coating is conductive ink.

27. The file folder of claim 25, wherein said conductive coating is formed of a conductive polymer.

28. The file folder of claim 18, wherein said addressable device includes an addressable switch that includes:

a ROM having a unique address stored therein;

address comparing means for comparing an address included in a control signal received from the processor with the unique address stored in said ROM; and state changing means for changing the state of said addressable switch when said address comparing means determines that the address included in the received control signal is the same as the unique address stored in said ROM.

29. The file folder of claim 28, wherein said addressable switch further includes a load transistor having a gate, a source, and a drain, said gate connected to said state changing means, wherein said state changing means changes the state of said addressable switch by turning on and off said load transistor.

30. The file folder of claim 29, further including an indicator light having a first terminal connected to said first conductor, and a second terminal connected to said source of said load transistor, wherein said drain of said load transistor is connected to said second conductor, and said indicator light is turned on when said load transistor is turned on by said state changing means.

31. The file folder of claim 18, wherein said first conductor additionally provides power to the addressable switch positioned on a file folder.

32. A file folder for use in an electronic file tracking system wherein file folders are stored in folder retainers communicatively coupled to the electronic file tracking system, comprising:

a folder having a contact surface;

an addressable device located on said folder;

a first conductor on said contact surface for providing control signals sent by the electronic file tracking system to said addressable device when said file folder is placed in a folder retainer of the electronic file tracking system; and a second conductor on said contact surface for providing a return path from said addressable device, wherein said first and second conductors are disposed on said contact surface in a pattern that allows contact with a plurality of differently configured electrical contacts provided in the folder retainers.

33. The file folder of claim 32, wherein said contact surface is located on an edge surface of said folder.

34. The file folder of claim 32, wherein said contact surface is located on the side surface of said folder.

35. The file folder of claim 32, wherein said contact surface is located on both a side surface and an edge surface of said folder.

36. A file folder for use in a file tracking system having a processor adapted to provide control signals to a file folder when disposed in a folder retainer, the file folder comprising:

at least one surface;

an addressable device carried by the file folder and having an address;

a first conductor on said surface electrically coupled to said addressable device for providing control signals to said addressable device when said file folder is placed in a folder retainer, said first conductor adapted to communicatively couple to the processor of the file tracking system, the control signals being provided by the processor; and a second conductor on said surface for providing a return path from said addressable device; and said first and second conductors are disposed in a pattern that allows for conductive contact between adjacent file folders.

37. The file folder of claim 36, wherein said pattern allows for conductive contact between adjacent file folders positioned in a vertical stack.

38. The file folder of claim 36, wherein said first conductor includes a first linear strip extending from a first edge of said surface to a central point on an adjacent second edge of said surface, and a second linear strip extending from said central point on said second edge of said surface to a third edge of said surface, which is opposite said first edge and adjacent said second edge; and said second conductor includes a first linear strip extending in parallel to said first linear strip of said first conductor from said first edge of said surface to said second edge of said surface, and a second linear strip extending in parallel to said second linear strip of said first conductor from said second edge of said surface to said third edge of said surface, said first and second linear strips of said second conductor are positioned an equal distance on opposite sides of said first conductor.

39. The file folder of claim 36, wherein said pattern allows for conductive contact between adjacent file folders hanging in a hanging file drawer.

40. The file folder of claim 39, wherein said pattern allows for conductive contact between adjacent file folders regardless of an orientation of the file folder within the hanging file drawer.

41. The file folder of claim 39 further including electrical contacts for coupling said addressable device to electrical conductors connected to the processor and provided on a support rail of a file drawer from which file folders may be suspended.

\* \* \* \* \*

UNITED STATES PATENT AND TRADEMARK OFFICE
CERTIFICATE OF CORRECTION

PATENT NO. : 5,739,765
DATED : April 14, 1998
INVENTOR(S) : Joel D. Stanfield et al.

It is certified that error appears in the above-identified patent and that said Letters Patent is hereby corrected as shown below:

Cover page, Abstract, line 10, "locating" should be --locate--.

Column 1, line 9, "flies" should be --files--.

Column 1, line 27, "flies" should be --files--.

Column 1, line 63, "doctors" should be --doctor's--.

Column 1, line 64, "anal" should be --and--.

Column 3, line   , after "signals" insert --to--.

Column 6, line 8, "cabinet 54a" should be --cabinet 50a--.

Column 6, line 9, "cabinet 54a" should be --cabinet 50a--.

Column 6, line 13, "cabinet 54a" should be --cabinet 50a--.

Column 7, line 33, "74a" should be --70a--.

Column 8, line 11, "84a" should be --80a--.

Column 8, line 21, "84a" should be --80a--.

Column 8, line 24, "84a" should be --80a--.

Column 9, line 1, "84a" should be --80a--.

Column 9, line 2, "84a" should be --80a--.

Column 9, line 6, "84a" should be --80a--.

UNITED STATES PATENT AND TRADEMARK OFFICE
CERTIFICATE OF CORRECTION

PATENT NO. : 5,739,765
DATED : April 14, 1998
INVENTOR(S) : Joel D. Stanfield et al.

It is certified that error appears in the above-identified patent and that said Letters Patent is hereby corrected as shown below:

Column 9, line 7, "70b" (second occurrence) should be --70c--.

Column 9, line 38, "Conductive" should be --conductive--.

Column 9, line 55, "84a" should be --80a--.

Column 9, line 56, "84a" should be --80a--.

Column 9, line 62, "84a" should be --80a--.

Column 9, line 59, "74a" should be --70a--.

Column 10, line 63, "for for" should be --or for--.

Column 11, line 15, "staff" should be --start--.

Column 11, line 26, after "length" insert --of--.

Column 11, line 60, "Which" should be --which--.

Column 12, line 28, "inquires" should be --inquiries--.

Column 13, line 18, "the-number" should be --the number--.

Column 13, line 34, "(Step (324)" should be --(Step 324)--.

Column 13, lines 60 and 61, "(Step 3 10)" should be --(Step 310)--.

UNITED STATES PATENT AND TRADEMARK OFFICE
CERTIFICATE OF CORRECTION

PATENT NO. : 5,739,765
DATED : April 14, 1998
INVENTOR(S) : Joel D. Stanfield et al.

It is certified that error appears in the above-identified patent and that said Letters Patent is hereby corrected as shown below:

Column 14, line 10, "this-secondary" should be --this secondary--.

Column 14, line 30, "(Step (324)" should be --(Step 324)--.

Column 16, lines 21 and 22, "intention" should be --invention--.

Column 17, line 13, "Rb" should be --RF--.

Column 17, line 45, before "unique" delete "a".

Column 19, line 11, after "to" delete "cl".

Signed and Sealed this

Fifth Day of January, 1999

Attest:

Attesting Officer

Acting Commissioner of Patents and Trademarks